United States Patent
Gaither

(10) Patent No.: US 8,782,466 B2
(45) Date of Patent: Jul. 15, 2014

(54) MULTIPLE PROCESSING ELEMENTS

(75) Inventor: Blaine D Gaither, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 299 days.

(21) Appl. No.: 13/366,185

(22) Filed: Feb. 3, 2012

(65) Prior Publication Data

US 2013/0205169 A1    Aug. 8, 2013

(51) Int. Cl.
*G06F 11/00* (2006.01)

(52) U.S. Cl.
USPC .............................. 714/11; 714/13

(58) Field of Classification Search
USPC ................................ 714/10, 11, 13
See application file for complete search history.

(56) References Cited

U.S. PATENT DOCUMENTS

| | | | | |
|---|---|---|---|---|
| 7,389,440 B2* | 6/2008 | Bailey et al. | | 713/323 |
| 7,404,105 B2* | 7/2008 | Arai | | 714/13 |
| 7,634,678 B2* | 12/2009 | Winbom | | 713/501 |
| 7,814,366 B2* | 10/2010 | Apparao et al. | | 714/13 |
| 8,412,981 B2* | 4/2013 | Munoz et al. | | 714/12 |
| 2003/0065966 A1* | 4/2003 | Poisner | | 713/500 |
| 2005/0039067 A1* | 2/2005 | Tsau et al. | | 713/600 |
| 2006/0212677 A1* | 9/2006 | Fossum | | 712/1 |
| 2007/0074011 A1* | 3/2007 | Borkar et al. | | 712/227 |
| 2007/0186123 A1 | 8/2007 | Winbom et al. | | |
| 2008/0091974 A1* | 4/2008 | Nakashima | | 714/10 |
| 2009/0094481 A1* | 4/2009 | Vera et al. | | 714/11 |
| 2009/0235108 A1 | 9/2009 | Gold et al. | | |
| 2009/0328055 A1* | 12/2009 | Bose et al. | | 718/105 |
| 2012/0102499 A1* | 4/2012 | Flemming et al. | | 718/104 |
| 2012/0216058 A1* | 8/2012 | Wells et al. | | 713/322 |
| 2012/0266179 A1* | 10/2012 | Osborn et al. | | 718/105 |

OTHER PUBLICATIONS

Greskamp, B., et al.; Paceline: Improving Single-thread Performance in Nanoscale CMPs Through Core Overclocking; .Sep. 15-19, 2007; < http://ieeexplore.ieee.org/xpl/freeabs_all.jsp?arumber=4336213 > on pp. 213-224.

* cited by examiner

*Primary Examiner* — Marc Duncan
(74) *Attorney, Agent, or Firm* — Christopher W. Ferguson

(57) ABSTRACT

A first processing element can run within a first operating range. A second processing element can run within a second operating range. A third processing element can be activated if the second processing element fails or can be refrained from being run unless the first or second processing element fails.

21 Claims, 6 Drawing Sheets

MULTIPLE PROCESSING ELEMENTS

BACKGROUND

Computing systems, such as workstations, desktops, and tablets, may include microprocessors for executing computing instructions. Some systems and devices include multiple microprocessors and/or multiple cores within a microprocessor. Managing multiple microprocessors and/or multiple cores can be challenging.

BRIEF DESCRIPTION OF DRAWINGS

The following detailed description refers to the drawings, wherein.

DETAILED DESCRIPTION

Computing systems can be manufactured to include multiple processing elements. For example, a system can include multiple microprocessors and/or multiple cores in a microprocessor. In addition, some systems can be modified so that one or more of the processing elements is run outside a normal, safe operating range of the processor. Running a processing element outside its normal operating range may be referred to as overclocking the processing element. According to an embodiment, the multiple processing elements of a computing system may be divided into three groups, each group containing one or more processing elements. The first group may be a normal operating range group in which the one or more processing elements are restricted to run within their normal operating range. The second group may be an overclocked operating range group in which the one or more processing elements are allowed to run outside their normal operating range. The third group may be a replacement group. A processing element in the replacement group may be inactive at first but may be activated when a processing element from the first or second group fails.

There may be many advantages to a computing system according to this embodiment. For example, instead of having all of the processing elements in a computing system activated at once and being underutilized, only a subset of the processing elements may be activated according to current computing needs. This can prolong the overall life of the entire group of processing elements. This can also conserve energy and promote computing efficiency. Another advantage is that the system can benefit from overclocked processing elements without compromising a minimal level of processing element life and speed. This benefit may derive from holding out a subset of the processing elements to never be overclocked, thus never exposing those processing elements to the stresses and potential breakdown that may result from overclocking. Finally, a basic level of performance as well as an enhanced level of performance may be ensured based on the availability of spare processing elements in the third group, even despite an early, unexpected failure of a processing element from the first or second group. This can prolong the life of the computing system as well as save time and expense associated with servicing the computing system. This can also enable a manufacturer to allow a customer to overclock some of the processing elements on the customer's system while still providing a warranty based on the non-overclocked processing elements.

Further details of these embodiments and associated advantages, as well as of other embodiments and applications, will be discussed in more detail below with reference to the drawings.

Figure 1:
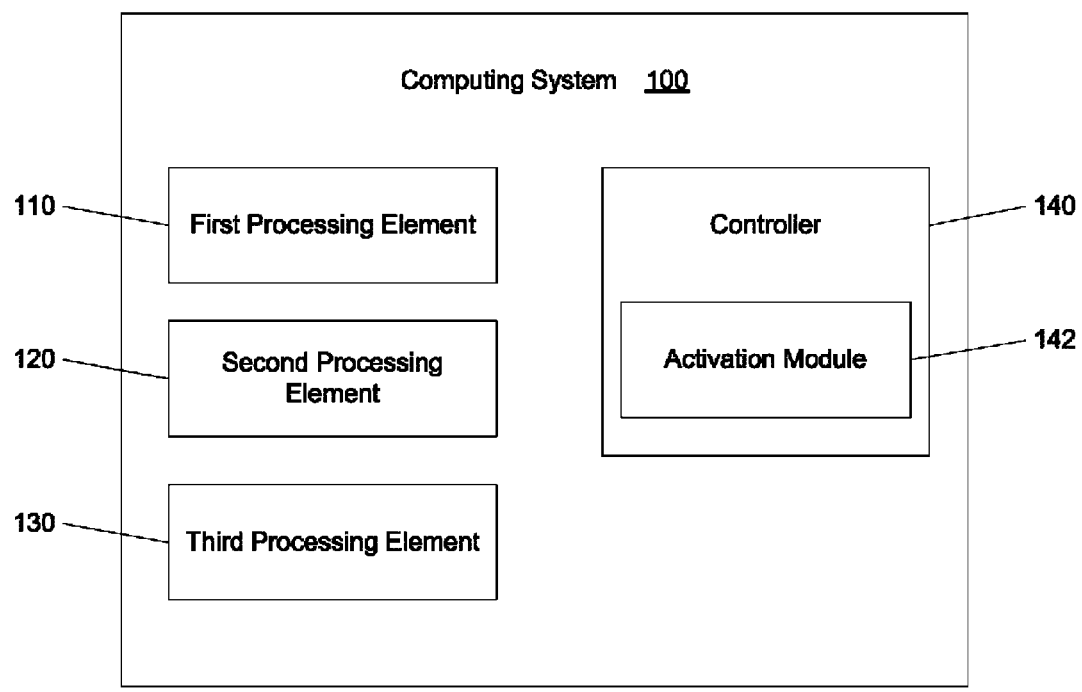
FIG. 1 is a block diagram illustrating a computing system including multiple processing elements, according to an example.

Referring now to the drawings, FIG. 1 is a block diagram illustrating a computing system 100, according to an embodiment. Computing system 100 may be any of a variety of computing systems or devices. For example, computing system 100 may be a workstation computer, a desktop computer, a laptop computer, a tablet or slate computer, a cellular telephone, a smart phone, or a media player, among others.

Computing system 100 may include a controller 140 having an activation module 142. Controller 140 may include a processor and a memory for implementing activation module 142. The processor may include a central processing unit (CPU), a semiconductor-based microprocessor, a digital signal processor (DSP) such as a digital image processing unit, other hardware devices or processing elements suitable to retrieve and execute instructions stored in memory, or multiples or combinations thereof. The processor can include single or multiple cores on a chip, multiple cores across multiple chips, multiple cores across multiple devices, or combinations thereof. The processor may fetch, decode, and execute instructions from memory to perform various functions. As an alternative or in addition to retrieving and executing instructions, the processor may include at least one integrated circuit (IC), other control logic, other electronic circuits, or combinations thereof that include a number of electronic components for performing various tasks or functions.

Controller 140 may include memory, such as a machine-readable storage medium. The machine-readable storage medium may be any electronic, magnetic, optical, or other physical storage device that contains or stores executable instructions. Thus, the machine-readable storage medium may comprise, for example, various Random Access Memory (RAM), Read Only Memory (ROM), flash memory, and combinations thereof. For example, the machine-readable medium may include a Non-Volatile Random Access Memory (NVRAM), an Electrically Erasable Programmable Read-Only Memory (EEPROM), a storage drive, a NAND flash memory, and the like. Further, the machine-readable storage medium can be computer-readable and non-transitory.

Computing system 100 may also include a first processing element 110, a second processing element 120, and a third processing element 130. The processing elements may be processors (as described above regarding controller 140), microprocessors, central processing units, or cores of a microprocessor. The processing elements may be located on the same chip or on different chips. The processing elements may share various computing resources and components, such as cache memory. Additionally, the first, second, and third processing elements 110-130 may represent groups of processing elements. For example, each of the first, second, and third processing elements may include more than one processing element.

Computing system 100 may use processing elements 110-130 to execute instructions. For example, processing elements 110-130 may be managed so that an appropriate number of processors are used to execute instructions, based on the number of open application programs, the processing needs of the computing system 100 and the programs, and the like. Processing elements 110-130 may be managed by controller 140. Alternatively, processing elements 110-130 may be managed by one of the processing elements itself. For instance, the first processing element 110 may manage the operation of and division of labor between the multiple processing elements. In other examples, a completely different processing element (not illustrated) may manage the processing elements.

The first processing element 110 can be configured to run within a normal operating range. A processing element may have an operating range associated with it that corresponds to a safe operating range. For example, a processing element may be designed to run at a clock rate of up to 2 GHz. The safe operating range for such a processing element may be from 0 GHz to 2 GHz. Operating the processing element at a clock speed above 2 GHz may cause premature degradation and failure of the processing element due to the increased stress and heat placed on the processing element as a result of the increased speed. Accordingly, first processing element 110 may be configured to run within a normal operating range, which may correspond to its safe operating range.

Moreover, first processing element 110 may be restricted from running at an operating range outside its normal operating range. For example, controller 140 may manage first processing element 110 such that it is not run outside its normal operating range. An operating system running on computing system 100 may additionally be used to regulate and restrict the operating speed of first processing element 110. Alternatively, firmware may restrict the operating speed of first processing element 110. For example, firmware associated with first processing element 110, firmware associated with a Basic Input/Output system (BIOS) of computing system 100, or firmware associated with an Extended Firmware Interface (EFI) of computing system 100 may restrict the operating range of first processing element 110.

Second processing element 120 can be configured to run within a normal operating range or within an overclocked operating range. The normal operating range may be a safe operating range of second processing element 120. In some examples, the normal operating range of second processing element 120 may be the same operating range as the normal operating range of first processing element 110. The overclocked operating range may extend beyond the normal operating range. For example, if the normal operating range of the second processing element 120 is 2 GHz, the overclocked operating range may encompass a range up to 20% above the highest value of the normal operating range. Accordingly, for instance, the overclocked operating range may be from 0 to 2.4 GHz (rather than the normal operating range of 0 to 2.0 GHz). In some examples, the overclocked operating range may be less or more than 20% above the highest value of the normal operating range.

Third processing element 130 can be a spare processing element. The third processing element 130 may be inactive during initial operation of computing system 100. Activation module 142 of controller 140 may activate third processing element 130 if the second processing element 120 fails. In some examples, activation module 142 may activate third processing element 130 if the first processing element 110 fails. The third processing element 130 may thus take the place of a failed processing element. Accordingly, computing system 100 may continue to operate as it did before the failure.

Failure of a processing element may be detected and determined in many ways. For example, if the processing element does not respond when contacted, it may be assumed that the processing element has failed. The processing element may be contacted by various components within computing system 100 in various scenarios, but most obviously the processing element may be contacted if it is being managed by another processing element, such as controller 140 or the first processing element 110. Other signs that the processing element is failing may be an increased error or failure rate (e.g., dropped instructions) or an increase in soft errors (e.g., an error to data being processed by the processing element). Failure of the processing element may be defined based on any of the above conditions and may correspond to what is deemed an unacceptable rate of errors or failures. Activation module 142 may be configured to activate the third processing element 130 if determined that the processing element has failed.

As described above, controller 140 may be a separate processing element from processing elements 110-130. However, in some examples controller 140 may be implemented by the first processing element 110 or the second processing element 120. In one example, controller 140 may be implemented by the first processing element 110 since first processing element 110 is not subject to increased risk of failure due to overclocking.

Figure 2:
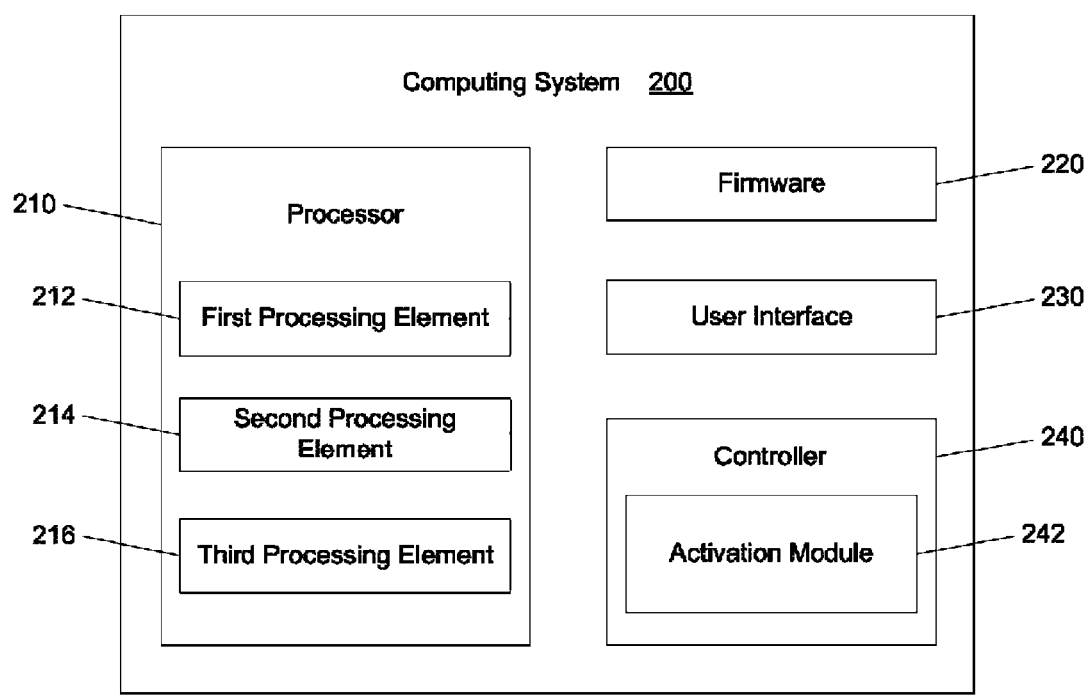
FIG. 2 is a block diagram illustrating a computing system including multiple processing elements, according to an example.

FIG. 2 is a block diagram illustrating an example of a computing system 200. Computing system 200 may include a processer 210 including first, second, and third processing elements 212, 214, 216, which may be cores of processor 210. In some examples, each of the processing elements 212, 214, 216, may include multiple processing elements. These processing elements may be divided into three groups, as described above, wherein the first processing element is run within a normal operating range, the second processing element is run within a normal operating range or an overclocked operating range, and the third processing element may be a spare processor element.

Computing system 200 may include controller 240, which may include activation module 242. Controller 240 and activation module 242 may be similar to controller 140 and activation module 142. For example, activation module 242 may activate the third processing element 216 if the first processing element 212 or the second processing element 214 fails.

Computing system 200 may additionally include firmware 220. Firmware 220 may restrict the operating range of the first processing element 212. Firmware 220 may be associated only with processing element 212. In some examples, firmware 220 may be located in processor 210 and/or first processing element 212. Firmware 220 may be a part of a BIOS or EFI of computing system 200.

Computing system 200 may also include user interface 230. User interface 230 may be implemented by controller 240, processor 210, or by another microprocessor. User interface 230 may be associated with a display (not shown) and input device (not shown) of computing system 200. User interface 230 may provide a user interface for setting an operating range of the second processing element 214. For example, a user may use user interface 230 to set the operating range of the second processing element 214 to be an overclocked operating range. For instance, the user may set the maximum clock speed which he would like the second processing element 214 to run at. The user interface 230 may be configured so as not to allow the user to set an impermissible operating range. For example, an impermissible operating range may be over 50% of the highest value of the normal operating range.

In some examples, the user interface 230 may be used to set the operating range of the third processing element 216 if it has been activated. For instance, if the third processing element 216 has been activated to replace the second processing element, the user interface 230 may be used to set the third processing element 216 to run at a normal operating range or an overclocked operating range.

Figure 3:
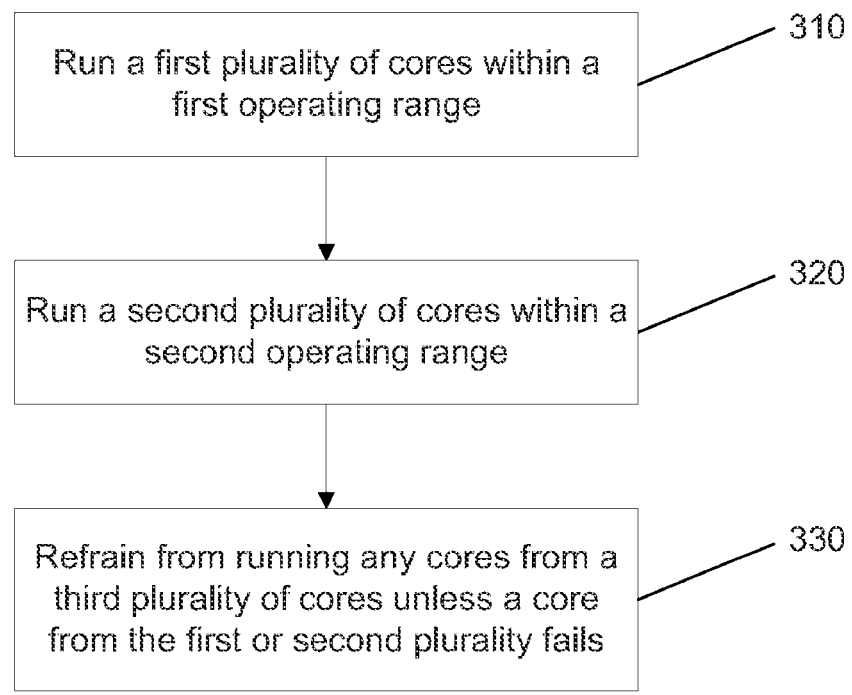
FIG. 3 is a flowchart illustrating aspects of a process to manage multiple processor cores, according to an example.

FIG. 3 is a flowchart illustrating aspects of a method 300 that can be executed by a computing system, according to an example. Although execution of method 300 is described below with reference to the components of computing system 200, other suitable components for execution of method 300 can be used, such as components of computing system 100 or computer 600. Method 300 may be implemented in the form of executable instructions stored on a machine-readable medium or in the form of electronic circuitry. A processor, a machine-readable storage medium, other control logic, or a combination thereof can be used to execute method 300.

Method 300 may start at 310 where a first plurality of cores of a processor may be run only within a first operating range. The first operating range may be a safe operating range associated with the cores. For example, computing system 200 may run first processing element 212 of processor 210 at a safe operating range. Additionally, the first plurality of cores can be restricted from running outside the first operating range. At 320, a second plurality of cores of the processor may be run within a second operating range. The second operating range may be different from the first operating range. The second operating range may be an overclocked operating range, as described above. Accordingly, for example, computing system 200 may run second processing element 214 of processor 210 at an overclocked operating range. At 330, method 300 may refrain from running any cores from a third plurality of cores of the processor unless a core from the first or second plurality of cores fails. Method 300 may run a core from the third plurality of cores to replace a failed core from the first or second plurality of cores. For example, computing system 200 may refrain from activating and running the third processing element 216 of processor 210. However, if one of the first or second processing elements 212, 214 fails, computing system 200 may activate the third processing element (or one element of the third processing element 216) to replace the failed processing element.

In some examples, the first operating range may be an acceptable range under a warranty for a processor. On the other hand, the second operating range may be an unacceptable range under the warranty for the processor. Accordingly, a warranty may be offered for the processor based on the first plurality of cores being run according to the first, acceptable operating range. Meanwhile, overclocking of the second plurality of cores may be permitted without voiding the warranty.

Figure 4:
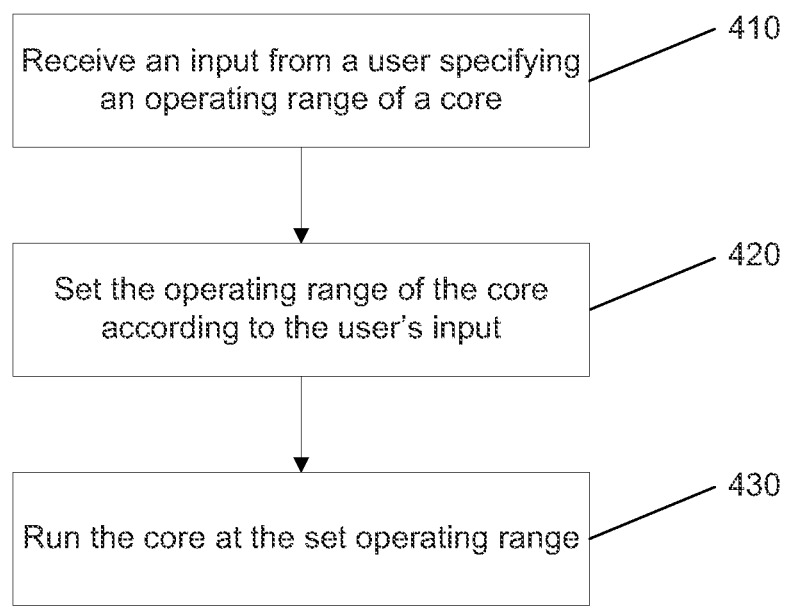
FIG. 4 is a flowchart illustrating aspects of a process to set an operating range of a processor core, according to an example.

FIG. 4 is a flowchart illustrating aspects of a method 400 that can be executed by a computing system, according to an example. Although execution of method 400 is described below with reference to the components of computing system 200, other suitable components for execution of method 400 can be used, such as components of computing system 100 or computer 600. Method 400 may be implemented in the form of executable instructions stored on a machine-readable medium or in the form of electronic circuitry. A processor, a machine-readable storage medium, other control logic, or a combination thereof can be used to execute method 400.

Method 400 may start at 410 where an input may be received from a user. The input may specify an operating range of a core. For instance, the input may specify the second operating range associated with the second plurality of cores. Alternatively, the input may specify the operating range of a newly activated core from the third plurality of cores. For example, computing system 200 may receive an input from a user via user interface 230 to set the operating range of the second processing element 214 or third processing element 212. At 420, the operating range of the core may be set based on the user's input. At 430, the core may be run at the set operating range.

Figure 5:
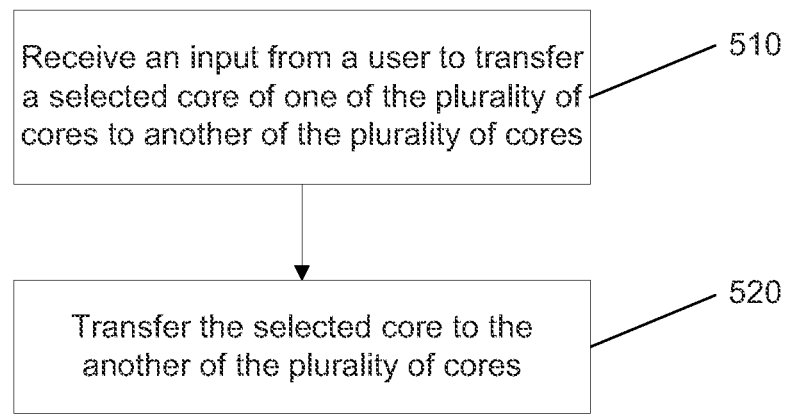
FIG. 5 is a flowchart illustrating aspects of a process to transfer a processor core from one group to another, according to an example.

FIG. 5 is a flowchart illustrating aspects of a method 500 that can be executed by a computing system, according to an example. Although execution of method 500 is described below with reference to the components of computing system 200, other suitable components for execution of method 500 can be used, such as components of computing system 100 or computer 600. Method 500 may be implemented in the form of executable instructions stored on a machine-readable medium or in the form of electronic circuitry. A processor, a machine-readable storage medium, other control logic, or a combination thereof can be used to execute method 500.

Method 500 may start at 510 where an input may be received from a user. The input may specify a core from one of the first, second, or third plurality of cores to be transferred to another of the first, second, or third plurality of cores. The another of the first, second, or third plurality of cores (that is, the group of cores to which the selected core is to be transferred) may be specified by the input. In computing system 200, the input may be received via user interface 230.

A user may wish to transfer cores between groups of cores for various reasons. For example, if all of the cores in the first plurality of cores fail and there are no cores left in the third plurality of cores, the user may wish to transfer one or more cores from the second plurality of cores to the first plurality of cores. This may be beneficial so as to disallow further overclocking of the transferred cores in order to prolong the useful life of the processor. In another example, all of the cores in the second plurality of cores may have failed and there may not be any cores left in the third plurality of cores. In such a case, the user may wish to transfer one or more cores from the first plurality of cores to the second plurality of cores so that he may achieve overclocked performance with the computing system. This may be attractive to the user if the warranty for the computing system has run out, for example, and so he is no longer worried about voiding the warranty. In an additional example, a user may wish to transfer one or more cores from the third plurality of cores to the first plurality of cores. For instance, the user may wish to preserve the transferred cores for regular, non-overclocked performance, and so the transfer may prevent the core from being used by the computing system to replace a failed core from the second plurality of cores. Other scenarios for transferring cores between groups exist as well.

At 520, the selected core may be transferred to the another of the first, second, or third plurality of cores. As noted previously, the received input may indicate to which plurality of cores the specified core is to be transferred. In computing system 200, controller 240 and/or another processor or processing element may be used to implement the transfer. For example, where controller 240 manages the first, second, and third plurality of cores 212, 214, 216, the transfer can be effected by causing controller 240 to manage the specified core according to the conditions and operating specifications of the group to which the core is transferred.

Figure 6:
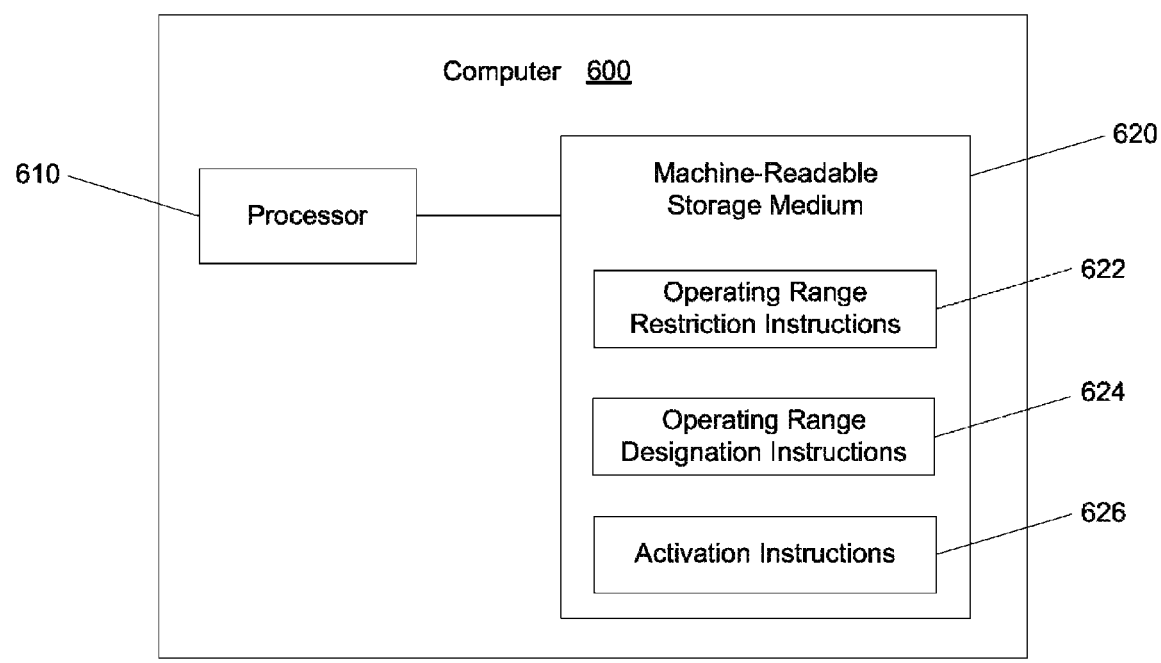
FIG. 6 is a block diagram illustrating a computer including a machine-readable storage medium encoded with instructions to manage multiple processing elements, according to an example.

FIG. 6 is a block diagram illustrating aspects of a computer 600 including a machine-readable storage medium 620 encoded with instructions, according to an example. Computer 600 may be any of a variety of computing devices, such as a workstation computer, a desktop computer, a laptop computer, a tablet or slate computer, a cellular telephone, a smart phone, or a media player, among others.

Processor 610 may be at least one central processing unit (CPU), at least one semiconductor-based microprocessor, at least one digital signal processor (DSP) such as a digital image processing unit, other hardware devices or processing elements suitable to retrieve and execute instructions stored in machine-readable storage medium 620, or combinations thereof. Processor 610 can include single or multiple cores on a chip, multiple cores across multiple chips, multiple cores across multiple devices, or combinations thereof. Processor 610 may fetch, decode, and execute instructions 622, 624, 626, among others, to implement various processing. As an alternative or in addition to retrieving and executing instructions, processor 610 may include at least one integrated circuit (IC), other control logic, other electronic circuits, or combinations thereof that include a number of electronic components for performing the functionality of instructions 622, 624, 626. Accordingly, processor 610 may be implemented across multiple processing units and instructions 622, 624, 626 may be implemented by different processing units in different areas of computer 600.

Machine-readable storage medium 620 may be any electronic, magnetic, optical, or other physical storage device that contains or stores executable instructions. Thus, the machine-readable storage medium may comprise, for example, various Random Access Memory (RAM), Read Only Memory (ROM), flash memory, and combinations thereof. For example, the machine-readable medium may include a Non-Volatile Random Access Memory (NVRAM), an Electrically Erasable Programmable Read-Only Memory (EEPROM), a storage drive, a NAND flash memory, and the like. Further, the machine-readable storage medium 620 can be computer-readable and non-transitory. Machine-readable storage medium 620 may be encoded with a series of executable instructions for managing processing elements.

The instructions 622, 624, 626, when executed by processor 610 (e.g., via one processing element or multiple processing elements of the processor) can cause processor 610 to perform processes, for example, the processes depicted in FIGS. 3-5. Furthermore, computer 600 may be similar to computing systems 100, 200 and may have similar functionality and be used in similar ways, as described above.

Operating range restriction instructions 622 can cause processor 610 to restrict a first core of processor 610 to be run only within a safe operating range. In some examples, the first core of the processor may be a group of cores restricted to be run within the safe operating range.

Operating range designation instructions 624 can cause processor 610 to run a second core of processor 610 within a designatable operating range. The designatable operating range may include values outside the safe operating range. Thus, the designatable operating range may be an overclocked operating range. In some examples, the designatable operating range may be set based on user input received via a user interface, such as user interface 230 of computing system 200. Additionally, in some examples the second core of the processor may be a group of cores run within the designatable operating range.

Activation instructions 626 can cause processor 610 to activate a third core of processor 610 if the second core fails. In some examples, activation instructions 626 can cause processor 610 to activate the third core of processor 610 if the first core fails.

What is claimed is:

1. A system comprising:
   a first group including a first processing element configured to run only within a normal operating range;
   a second group including a second processing element configured to run within a second operating range different from the normal operating range, the second operating range including an overclocked operating range;
   a third processing element;
   a controller to activate the third processing element if the second processing element fails; and
   a user interface to receive a user input requesting transfer of a selected processing element between the first group and the second group.

2. The system of claim 1, wherein the controller is configured to activate the third processing element if the first processing element fails.

3. The system of claim 1, wherein the first processing element is a first core of a processor, the second processing element is a second core of the processor, and the third processing element is a third core of the processor.

4. The system of claim 1, wherein the controller is configured to control the first processing element to run within the normal operating range and the controller is configured to control the second processing element to run within the second operating range.

5. The system of claim 1, wherein the user interface is configured to receive an operating range setting input from a user to set the second operating range, the operating range setting input specifying a frequency range including frequencies beyond the normal operating range.

6. The system of claim 5, wherein the user interface is configured to receive an input from the user to set an operating range of the third processing element if the third processing element is activated.

7. The system of claim 1, comprising firmware to prevent the first processing element from being overclocked.

8. The system of claim 1, wherein the controller is responsive to the user input by transferring the selected processing element between the first group and the second group, and wherein after the transfer of the selected processing element, the controller is to manage operation of the selected processing element according to an operating specification of a group to which the selected processing element is transferred, the operating specification including the normal operating range or the second operating range.

9. The system of claim 8, wherein the user input requests transfer of the selected processing element from the first group to the second group, and wherein the operating specification includes the second operating range.

10. The system of claim 8, wherein the user input requests transfer of the selected processing element from the second group to the first group, and wherein the operating specification includes the normal operating range.

11. The system of claim 8, wherein the third processing element is part of a spare group of spare processing elements that are initially non-operational, and wherein the user input is to further receive user input requesting transfer of a processing element from the spare group to the first group.

12. The system of claim 1, wherein the first group includes a plurality of first processing elements each configured to run only within the normal operating range, and the second group includes a plurality of second processing elements each configured to run within the second operating range.

13. A method comprising:
running a first group of cores of a processor only within a first operating range of frequencies;
running a second group of cores of the processor within a second operating range of frequencies different from the first operating range of frequencies;
refraining from running any cores from a third group of cores of the processor unless a core from the first or second groups of cores fails;
receiving, through a user interface, user input requesting transfer of a selected core of the processor between the first and second groups; and
transferring the selected core between the first and second groups in response to the user input.

14. The method of claim 13, comprising running a core from the third group of cores of the processor to replace a failed core from the first or second group of cores.

15. The method of claim 14, comprising receiving, through the user interface, an input setting an operating range of frequencies of a core from the third group of cores of the processor.

16. The method of claim 13, wherein the first operating range of frequencies is an acceptable range under a warranty for the processor and the second operating range of frequencies is an unacceptable range under the warranty for the processor.

17. The method of claim 13, wherein the first operating range of frequencies is within a normal operating range of the processor and the second operating range of frequencies includes frequencies outside the normal operating range of the processor.

18. The method of claim 13, comprising receiving, through the user interface, an input from a user setting the second operating range of frequencies, the operating range setting input specifying, for the second operating range of frequencies, a frequency range that includes frequencies beyond the first operating range of frequencies.

19. The method of claim 13, comprising:
receiving, through the user interface, an input from a user to transfer a selected core from the third group of cores to the first, of cores; and
transferring the selected core from the third group of cores to the first group of cores.

20. The method of claim 13, wherein receiving the user input comprises one of:
(1) receiving a user input requesting transfer of the selected core from the first group to the second group, and (2) receiving a user input requesting transfer of the selected core from the second group to the first group.

21. A non-transitory machine-readable storage medium encoded with instructions executable by a processor of a computer, the machine-readable medium comprising:
instructions to restrict a first core of the processor to be run only within a safe operating range of the processor, the first core within a first group;
instructions to run a second core of the processor within a designatable operating range, wherein the designatable operating range comprises frequency values outside the safe operating range, and the second core is within a second group; and
instructions to activate a third core of the processor if the second core fails; and
instructions to receive, through a user interface, a user input to transfer a selected core between the first group and the second group.

\* \* \* \* \*

UNITED STATES PATENT AND TRADEMARK OFFICE
CERTIFICATE OF CORRECTION

PATENT NO. : 8,782,466 B2
APPLICATION NO. : 13/366185
DATED : July 15, 2014
INVENTOR(S) : Blaine D Gaither Page 1 of 1

It is certified that error appears in the above-identified patent and that said Letters Patent is hereby corrected as shown below:

In the Claims

Column 10, line 8, Claim 19, delete "first," and insert -- first group --, therefor.

Signed and Sealed this
Fourth Day of November, 2014

Michelle K. Lee
*Deputy Director of the United States Patent and Trademark Office*